United States Patent
Haldeman et al.

(10) Patent No.: US 7,236,574 B2
(45) Date of Patent: *Jun. 26, 2007

(54) METHOD AND SYSTEM FOR PROVIDING COMMUNICATION SERVICES FOR HEARING-IMPAIRED PARTIES

(75) Inventors: Kurt P. Haldeman, Hiawatha, IA (US); William A. McClelland, Cedar Rapids, IA (US); Benjamin W. Dudley, Toddville, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 106 days.

This patent is subject to a terminal disclaimer.

(21) Appl. No.: 10/798,348

(22) Filed: Mar. 12, 2004

(65) Prior Publication Data

US 2005/0094776 A1 May 5, 2005

Related U.S. Application Data

(63) Continuation-in-part of application No. 10/699,823, filed on Nov. 4, 2003.

(60) Provisional application No. 60/517,899, filed on Nov. 7, 2003.

(51) Int. Cl.
*H04M 11/00* (2006.01)
(52) U.S. Cl. ..................... 379/52; 379/93.15
(58) Field of Classification Search ............... 379/52, 379/93.15, 93.35, 93.09, 93.17, 93.21, 93.34, 379/93.23, 93.24, 90.01, 207.02, 218.02; 704/271, 260; 709/206, 227; 370/352
See application file for complete search history.

(56) References Cited

U.S. PATENT DOCUMENTS

| | | | |
|---|---|---|---|
| 5,680,443 A | 10/1997 | Kasday et al. | |
| 5,745,550 A | 4/1998 | Eisdorfer et al. | |
| 5,787,148 A | 7/1998 | August | |
| 5,809,112 A | 9/1998 | Ryan | |
| 5,959,629 A | 9/1999 | Masui | |
| 5,991,723 A * | 11/1999 | Duffin | 704/260 |
| 6,188,429 B1 | 2/2001 | Martin et al. | |
| 6,389,114 B1 | 5/2002 | Dowens et al. | |
| 6,421,425 B1 * | 7/2002 | Bossi et al. | 379/52 |

(Continued)

FOREIGN PATENT DOCUMENTS

WO  WO03/021796  3/2003

*Primary Examiner*—Stella Woo (57) ABSTRACT

A method for providing communication services for the hearing-impaired includes establishing a communication link between a hearing-impaired party and a communication assistant. The communication link may be a full duplex link. The communication assistant may also establish a voice link with a hearing party. The hearing-impaired party and the hearing party may then communicate, with the communication assistant acting as a conduit for the conversation. For example, the hearing party may send a voice message to the communication assistant. The communication assistant may then convert the voice message into a text message and transmit the text message to the hearing-impaired party. The communication assistant may also convert text messages received from the hearing-impaired party into voice messages for the hearing party.

22 Claims, 3 Drawing Sheets

U.S. PATENT DOCUMENTS

| | | |
|---|---|---|
| 6,430,602 B1 | 8/2002 | Kay et al. |
| 6,480,484 B2 * | 11/2002 | Morton ........................ 370/352 |
| 6,603,835 B2 | 8/2003 | Engelke et al. |
| 6,611,804 B1 * | 8/2003 | Dorbecker et al. ......... 704/271 |
| 6,628,967 B1 * | 9/2003 | Yue ............................ 455/557 |
| 6,714,793 B1 * | 3/2004 | Carey et al. ................ 455/466 |
| 6,757,732 B1 * | 6/2004 | Sollee et al. ............... 709/227 |
| 6,801,613 B1 * | 10/2004 | Hamilton ............... 379/207.02 |
| 6,914,964 B1 | 7/2005 | Levine |
| 6,950,500 B1 * | 9/2005 | Chaturvedi et al. ........... 379/52 |
| 6,950,501 B1 * | 9/2005 | Chaturvedi et al. ........... 379/52 |
| 2002/0037074 A1 | 3/2002 | Dowens et al. |
| 2002/0057765 A1 * | 5/2002 | Hyziak et al. ................. 379/52 |
| 2002/0065820 A1 * | 5/2002 | Enns ............................... 707/6 |
| 2002/0143533 A1 | 10/2002 | Lucas et al. |
| 2002/0199019 A1 * | 12/2002 | Battin et al. ................. 709/245 |
| 2003/0072420 A1 | 4/2003 | Feigenbaum |
| 2004/0024822 A1 | 2/2004 | Werndorfer et al. |
| 2004/0111268 A1 * | 6/2004 | Steel, Jr. ...................... 704/271 |

* cited by examiner

METHOD AND SYSTEM FOR PROVIDING COMMUNICATION SERVICES FOR HEARING-IMPAIRED PARTIES

RELATED APPLICATIONS

This application is a continuation-in-part of U.S. patent application Ser. No. 10/699,823 filed Nov. 4, 2003, the disclosure of which is incorporated by reference herein. This application also claims priority under 35 U.S.C. § 119 based on U.S. Provisional Application Ser. No. 60/517,899 filed Nov. 7, 2003, the disclosure of which is incorporated by reference herein.

FIELD OF THE INVENTION

The present invention relates to providing communication services and, more particularly, to providing communication services for hearing-impaired parties.

BACKGROUND OF THE INVENTION

A conventional telecommunication device for the deaf/teletype (TDD/TTY) enables people who are hearing-impaired or deaf to communicate with other parties via standard telephone lines. For example, one way in which a deaf party may communicate with another party is if both parties use a TDD. In this case, a calling party may type using a standard keyboard included with the TDD and the called party reads the message on a display associated with his/her TDD. The called party may similarly type a message using his/her TDD and the calling party may read the message using his/her display.

A second way in which a hearing-impaired/deaf person may communicate via standard telephone lines is referred to as relay. In this case, a conference call is established between a first party, a communication assistant (CA) (also referred to as a relay operator) and a second party. The first party may be a deaf person who has a TDD/TTY and the second party may be a person with normal hearing who does not have a TDD/TTY device.

When the deaf party wishes to make a call, he/she dials a telephone number for the CA and tells the CA the telephone number to which he/she would like to be connected. The CA may dial the number and provide a greeting to the hearing party. When the hearing party speaks, the CA types what is said and the deaf party reads the text using the TDD/TTY's display. The deaf party may respond to the message on the display by typing on his/her TDD/TTY. The CA reads what is typed to the hearing party in a normal manner. In this manner, the deaf party may communicate with hearing and hearing-impaired parties over the public switched telephone network using conventional TDD/TTY equipment.

One problem with the communication methods described above is that a TDD/TTY is required in order for the hearing-impaired party to communicate. This may prevent the hearing-impaired party from being able to communicate with others at various times due to the lack of an available TDD/TTY device. For example, if the hearing-impaired party is not at home, the hearing-impaired party may not have access to a TDD/TTY device.

SUMMARY OF THE INVENTION

There exists a need for systems and methods that provide additional ways in which a hearing-impaired party can communicate.

These and other needs are met by the present invention, where a hearing-impaired party may establish a connection with a CA using any conventional device that is able to execute a text messaging program, such as a conventional wireless device. The CA then connects the hearing-impaired party with the desired party. The CA and the hearing-impaired party may then communicate via text messaging. The CA may also place a call requested by the hearing-impaired party. The CA may then act as a conduit for the call, such as reading text messages sent from the wireless device and relaying voice messages corresponding to the received text messages to the call party. The CA may also receive voice messages from the hearing party and send text messages to the hearing-impaired party. By using text messaging, the hearing-impaired party is able to communicate with other parties over existing wired and wireless networks.

The reverse process may occur when a hearing party wishes to initiate communications with a hearing-impaired party. For example, the hearing party calls the CA, who may then initiate a connection to the hearing-impaired party, such as the hearing-impaired party's wireless device. The CA and the hearing-impaired party may then communicate via streaming text messages, with the CA acting as a conduit for the conversation with the calling party.

According to one aspect of the invention, a method for providing communication services is provided. The method includes receiving a request from a hearing-impaired party for establishing a communication link, identifying a communication assistant, forwarding the request to the communication assistant and establishing, by the communication assistant, a communication link to the hearing-impaired party using a text messaging program. The method also includes receiving a telephone number from the hearing impaired party, the telephone number being associated with a hearing party, establishing, by the communication assistant, a voice link with the hearing party and receiving, by the communication assistant, voice messages from the hearing party via the voice link. The method further includes generating text messages, by the communication assistant, the text messages corresponding to the voice messages and transmitting the text messages to the hearing-impaired party.

According to a further aspect of the invention, a system including a server and a first device associated with a first communication assistant is provided. The server is configured to receive a request from a wireless device associated with a hearing-impaired party for establishing a communication link to a hearing party, identify a first communication assistant and forward the request. The first device is configured to receive the request from the server and establish a full duplex communication link to the wireless device. The first device is also configured to communicate with the hearing-impaired party, via the wireless device, over the full duplex communication link using a text messaging program and establish a voice link with the hearing party.

Another aspect of the present invention provides a computer-readable medium that includes sequences of instructions, which when executed by a processor, cause the processor to receive a request from a wireless device associated with a hearing-impaired party, where the request is associated with establishing a communication link to a hearing party. The instructions also cause the processor to establish a communication link with the wireless device party using a text messaging program and establish a voice link to the hearing party.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

Systems and methods consistent with the present invention extend the reach of hearing-impaired parties by allowing such parties to communicate with CAs via text messaging, without requiring the use of a TDD/TTY.

Figure 1:
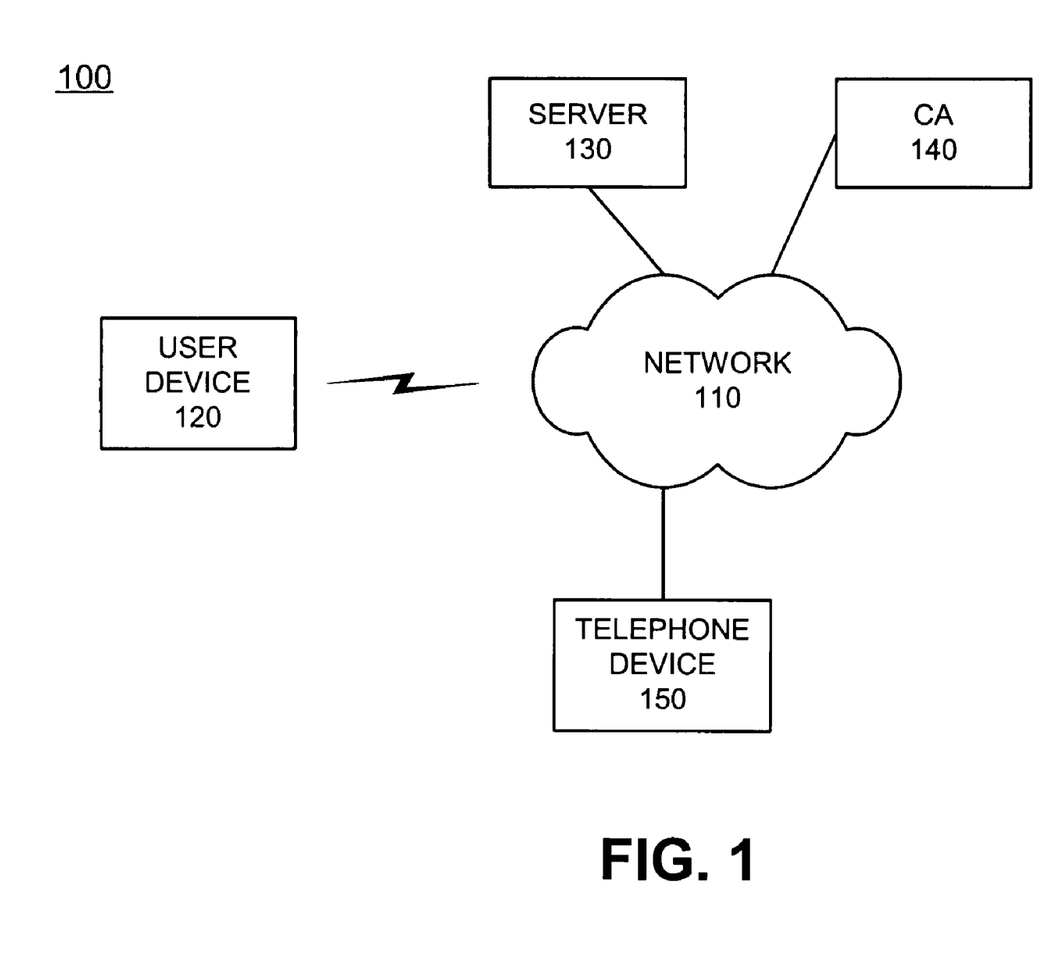
FIG. 1 is an exemplary system in which methods and systems consistent with the present invention may be implemented.

FIG. 1 is a block diagram of an exemplary system 100 in which methods and systems consistent with the present invention may be implemented. System 100 includes network 110, user device 120, server 130, CA 140, and telephone device 150. The exemplary configuration illustrated in FIG. 1 is provided for simplicity. It should be understood that a typical system may include more or fewer devices than illustrated in FIG. 1. For example, a conference bridge device/platform that links multiple parties in a conference call and the associated telephone circuits, switching devices, software or hardware controlled devices, etc., involved in completing the conference call may be included in system 100. These devices may be used to facilitate communications involving a hearing-impaired party, a CA and a hearing party.

Network 110 may include one or more wireless networks that are capable of receiving and transmitting wireless signals. For example, network 110 may include a number of transmission towers for receiving wireless signals and forwarding the wireless signals toward the intended destination. Network 110 may also include packet switched networks, such as the Internet, an intranet, a local area network (LAN), a wide area network (WAN), or another type of network that is capable of transmitting data from a source device to a destination device. Network 110 may further include one or more public switched telephone networks (PSTNs) or other type of switched network.

Network 110 may further include one or more devices, such as a network gateway, that allow divergent transport networks to communicate and cooperatively carry traffic. A network gateway may provide for interoperation at two levels, e.g., between different signaling schemes and between different media forms. For example, the network gateway may adapt between SS7 signaling used in a portion of network 110 and session initiation protocol (SIP) or H.323 protocols used by another portion of network 110. The network gateway may also adapt analog or pulse code modulation (PCM) encoded voice signals to a packetized data stream suitable for transport over network 110.

User device 120, consistent with the present invention, may include any device that is able to execute a text messaging software program. For example, user device 120 may include any wireless device, such as a cellular telephone, that executes a wireless application protocol (WAP), or another protocol, that enables user device 120 to transmit and receive data via a network, such as network 110. User device 120 may also include a personal computer (PC), a laptop computer, a personal digital assistant (PDA) or a web-based appliance that is able to execute a text messaging program and transmit and receive data to/from network 110 via wireless and/or wired connections.

Server 130 may include any server/computing device that is able to connect to network 110 and transmit and receive data via network 110. Server 130 may include a firewall (not shown) that provides security-related services for server 130.

Server 130 may also include a gateway (not shown) that supports persistent transmission control protocol (TCP)/Internet Protocol (IP) connections between user device 120 and other devices/parties. For example, the gateway may include one or more call processors that enable a client application programming interface (API) to maintain a persistent socket connection between a client application executed by user device 120 and CA 140. Server 130, as described in more detail below, enables a hearing-impaired user to establish communications with a CA to facilitate communications with a desired party.

Figure 2:
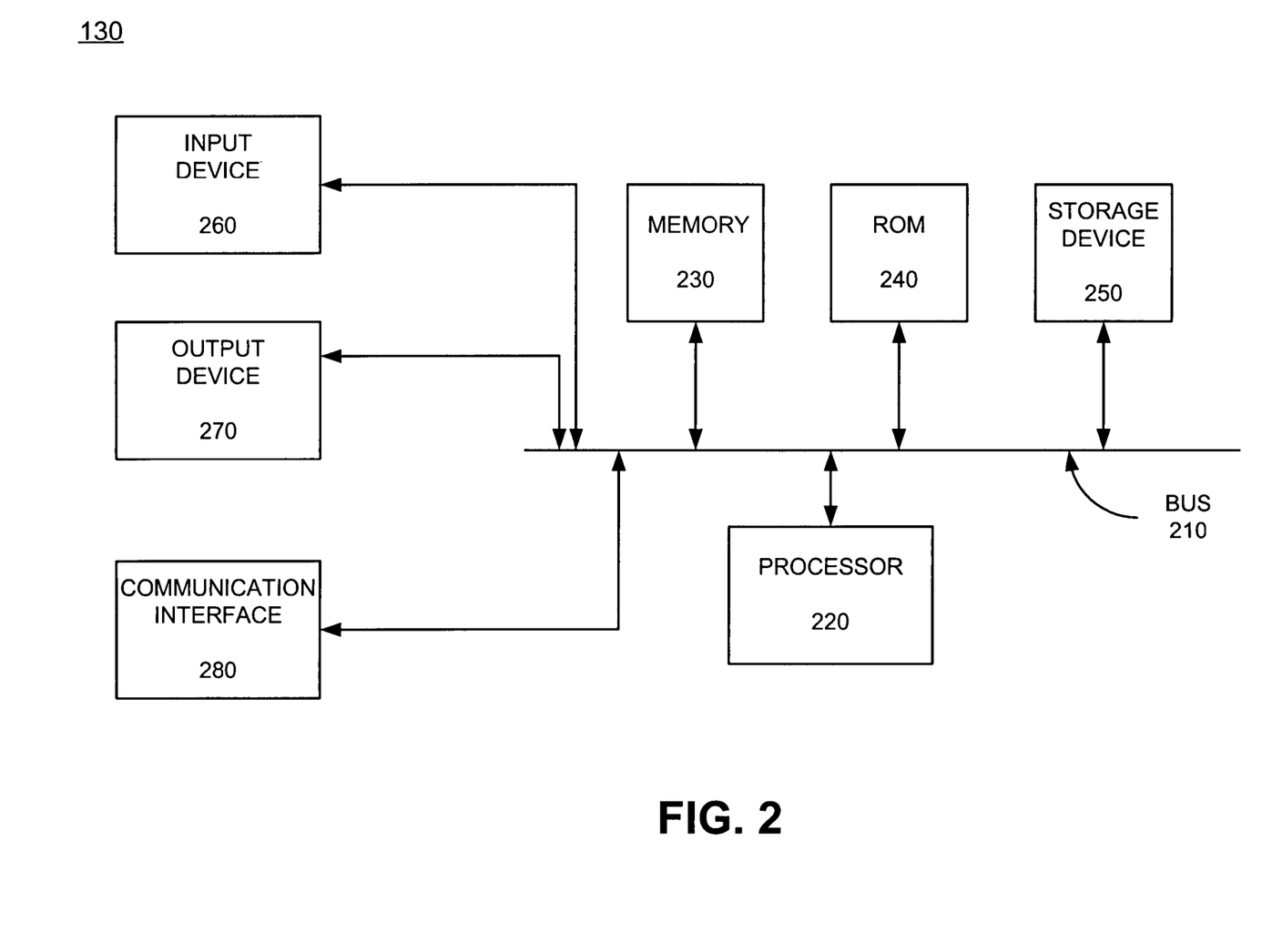
FIG. 2 is an exemplary block diagram of the server of FIG. 1 in which systems and methods consistent with the present invention may be implemented.

FIG. 2 illustrates an exemplary configuration of server 130 in an implementation consistent with the present invention. Other configurations may alternatively be used. Server 130 may include a bus 210, a processor 220, a memory 230, a read only memory (ROM) 240, a storage device 250, an input device 260, an output device 270, and a communication interface 280. Bus 210 permits communication among the components of server 130.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 130, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 130 to communicate with other devices and/or systems. For example, communication interface 280 may include a modem or an Ethernet interface to a LAN. Alternatively, communication interface 280 may include other mechanisms for communicating via a network.

Server 130, consistent with the present invention, provides a platform through which user device 120 may establish communications with CA 140. According to an exemplary implementation, server 130 performs processing associated with establishing communications with user device 120 in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the present invention. Thus, the present invention is not limited to any specific combination of hardware circuitry and software.

Referring back to FIG. 1, CA 140 may represent any conventional CA workstation and operator used to facilitate communications between a hearing-impaired party and a hearing party. CA 140 may include a workstation or computer, such as a personal computer or laptop, configured in a manner similar to server 130 illustrated in FIG. 2. For example, CA 140 may include one or more processors and memory devices, a display device, an input device, such as a keyboard, a microphone, a modem, and other devices that enable CA 140 to communicate with a hearing-impaired party. CA 140, consistent with the present invention, may also include any device capable of executing a text messaging software program to transmit and receive text messages. CA 140 may be used in any telerelay services (TRS) environment, such as a voice carry over (VCO) environment, a hearing carry over (HCO) environment, a speech-to-speech (STS) environment, etc. CA 140, consistent with the present invention, may be coupled to network 110 to facilitate communications with both hearing-impaired parties and hearing parties.

CA 140 may also include any conventional telephone (not shown), such as one used by a hearing party, that interfaces with the PSTN to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Server 130 and CA 140 are illustrated in FIG. 1 as being connected via network 110. In alternative implementations, server 130 and CA 140 may be connected directly to each other, connected via a LAN, connected via a private network, etc. In still other alternative implementations, the functions performed by server 130 and CA 140, described in more detail below, may be performed by a single device/platform.

Telephone device 150 may include any type of device that is capable of transmitting and receiving voice signals to/from a data network, such as network 110. For example, telephone device 150 may include any conventional telephone, such as those used by a hearing party, that interfaces with the PSTN to place and receive telephone calls. Telephone device 150 may be a standard telephone, a cordless telephone, a cellular telephone or any other type of conventional telephone.

Telephone device 150 may also include any client, such as a computer device, a web-based appliance, etc., that is configured to provide telephone functions. Telephone device 150 may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Figure 3:
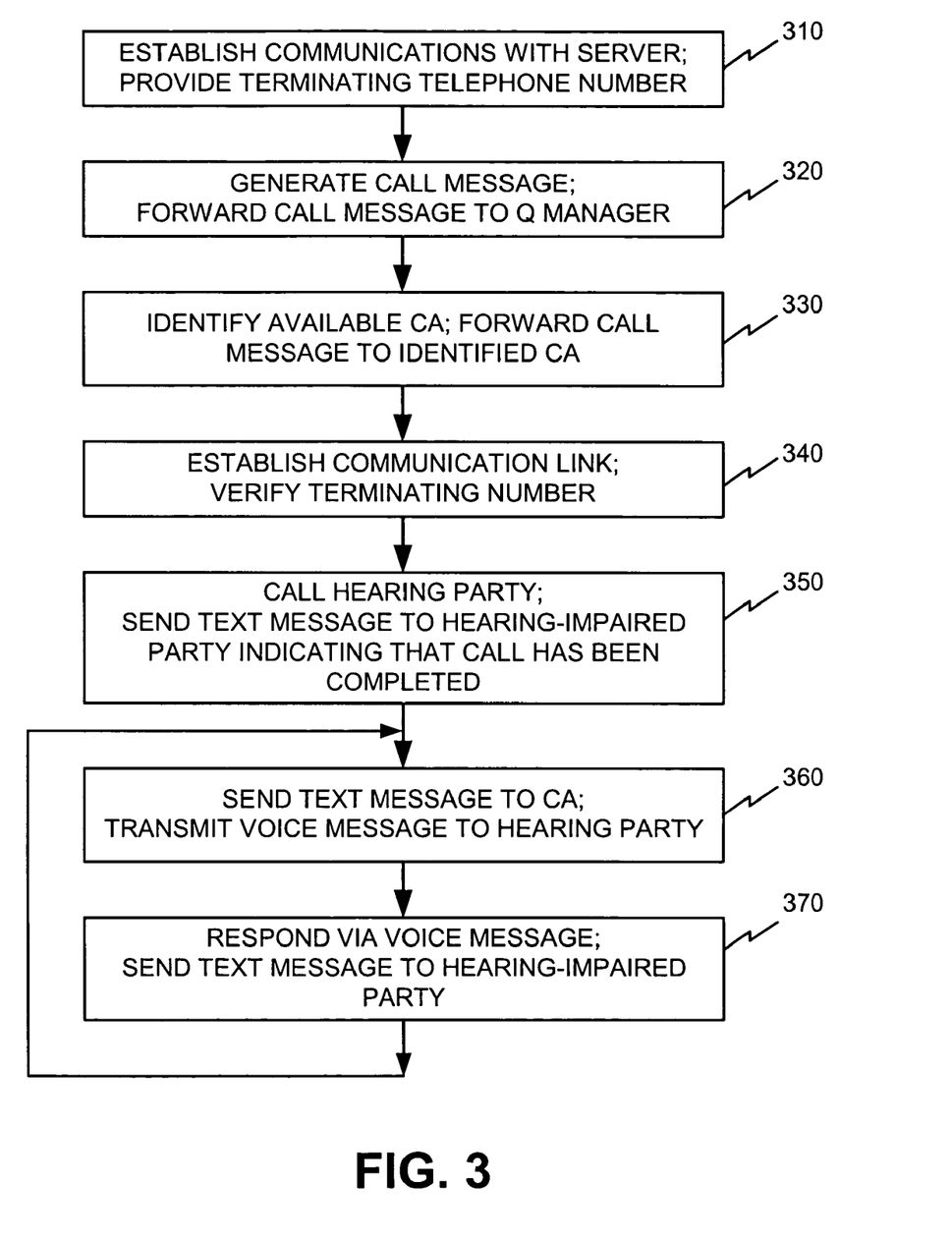
FIG. 3 is an exemplary flow diagram, consistent with the present invention, illustrating processing associated with providing communication services for a hearing-impaired party.

FIG. 3 is an exemplary flow diagram, consistent with the present invention, illustrating processing associated with establishing communications between a hearing-impaired party at user device 120 and a hearing party using telephone device 150. Processing may begin with a hearing-impaired party wanting to establish communications with another party, such as make a telephone call, via user device 120.

In this case, the hearing-impaired party may establish communications by initializing a socket to server 130 via user device 120 (act 310). For example, user device 120 may execute a wireless application protocol (WAP) that enables a party associated with user device 120 to enter an Internet address via user device 120. In this case, assume that the Internet address is a uniform resource locator (URL) associated with server 130. Further assume that the user wishes to open a socket connection between user device 120 and server 130. In this case, user device 120 transmits the URL associated with server 130 via network 110 along with a connection request for initializing a socket between user device 120 and server 130.

After receiving the connection request from user device 120, server 130 may accept the connection request. The resulting socket between user device 120 and server 130 may be a persistent, full duplex connection that facilitates communications between the hearing-impaired party, a CA and a hearing party. As described herein, the term "persistent, full duplex" refers to a communication link that is always connected and allows both parties to simultaneously transmit information. Such links do not require either the hearing-impaired party or the party at the opposite end (e.g., an operator at server 130 or CA 140) to press a "send" or "receive" button. Further, such full duplex links allow each party to view messages in a streaming manner. That is, as one of the parties types text messages, the other party is able to see the text as it is being typed in real-time or near real time.

In addition, it should be understood that user device 120, server 130 and CA 140 may all execute the same or compatible programs for establishing communications between themselves. For example, if user device 120 is executing a Java-based or JavaScript-based text messaging program and requests a socket connection with server 130, it is assumed that server 130 and CA 140 may also be executing or will launch that particular Java or JavaScript-based text messaging program or a compatible program so that user device 120, server 130 and CA 140 are able to communicate with each other.

After establishing communications with user device 120, server 130 may transmit text over the persistent, full duplex connection to user device 120 asking the user to enter a terminating telephone number to which he/she wishes to connect. Server 130 may also request the name of the hearing impaired party or an identifier associated with the hearing impaired party. The identifier may be mapped to a name via a database stored at server 130. The hearing-impaired party may respond via user device 120 with a text message indicating the telephone number to which he/she wishes to connect (act 310). The hearing-impaired party may also provide his/her name and the name of the party at the terminating telephone number with whom he/she wishes to communicate.

Server 130 receives the text information. Server 130 may reformat the received information and generate a call message for transmission to a queue manager process, referred to hereafter as the Q manager (act 320). The Q manager process may be executed by server 130. Alternatively, the Q manager process may be executed by another device coupled to server 130. Server 130 may generate the call message automatically or with input from an operator associated with server 130.

In either case, after server 130 generates and transmits the call message, the Q manager receives the call message and may search a table containing a list of CAs and their respective statuses. For example, the status of each CA may indicate whether that particular CA is busy with a current call, is off-line/not available or is available to help a caller. The table may be stored, for example, in storage device 250 (FIG. 2). Alternatively, when the Q manager is being executed by a device external to server 130, the table of CAs may be stored in a storage device accessible to the Q manager. In each case, the Q manager may identify and select a CA to assist the hearing-impaired user (act 330).

After selecting an available CA, the Q manager may set the status of the selected CA to "busy" and forward the call request message to the selected CA (act 330). For example, suppose that the selected CA corresponds to CA 140. In this case, CA 140 receives the call request message and outputs a signal to the operator associated with CA 140 indicating that a call request has been received. The signal to the operator may be audible, visual or a combination of audible/visual signals, to alert the operator that a call has been received. The console/display associated with CA 140 may indicate the name of the hearing-impaired party, the terminating telephone number and the name of the party with whom the hearing-impaired party wishes to communicate. This information may be provided in a screen or window that is "popped" or displayed on CA 140. CA 140 may also receive information from server 130 indicating the type of text messaging program being executed by user device 120. For example, if user device 120 is executing a Java-based text messaging program associated with a particular wireless service provider, server 130 will inform CA 140 of that information. CA 140 may then execute or launch that particular Java-based text messaging program or a compatible program so that the CA 140 and user device 120 are able to communicate. Alternatively, server 130 may forward the call to a particular CA that executes the compatible text messaging program.

CA 140 may then establish a communication link with user device 120 (act 340). For example, CA 140 may be configured to communicate with user device 120 through server 130. In this case, CA 140 may have a socket connection with server 130 that allows persistent, full duplex communications from CA 140 to user device 120, via the socket connection from server 130 to user device 120. Alternatively, CA 140 may establish a socket connection directly with user device 120 that provides a persistent, full duplex connection between CA 140 and user device 120. Details of forming such connections are not described in detail herein. However, the details of forming such connections would be obvious to one of ordinary skill in the art.

After the communication link between user device 120 and CA 140 is established, the operator of CA 140 may "chat" with the hearing-impaired party via text messaging to verify the terminating telephone number that the hearing-impaired party wishes to contact (act 340). For example, the operator of CA 140 may type in a text message, such as "Joe, the number you wish to connect to is 555-375-1377. Is that correct?"

After receiving verification regarding the terminating telephone number from the hearing-impaired party, the operator of CA 140 may dial the terminating telephone number using a telephone device associated with CA 140 (act 350). In this example, assume that the terminating telephone number is associated with telephone device 150. Further assume that a hearing party at telephone device 150 answers the call. In this case, CA 140 may provide a voice greeting to the hearing party informing the hearing party that a telephone call from a hearing-impaired person is to commence, along with the name and other information associated with the hearing-impaired party. The operator of CA 140 may also send a text message to user device 120 indicating that the call has been established to the terminating party, i.e., the hearing party (act 350).

The hearing-impaired party may then send a text message to CA 140 via user device 120 (act 360). The text message may be a typical message that the hearing-impaired party wishes to communicate to the hearing party, such as "Hi Bill, this is Joe, how are you doing?" When CA 140 receives the text message, the operator associated with CA 140 voices a message corresponding to the text message to the terminating party (i.e., the hearing party) at telephone device 150 (act 360).

The hearing party may then respond to CA 140 via a conventional voice message (act 370). The operator associated with CA 140 receives the voice message and may then type the text corresponding to the voice message and transmits a text message to the hearing-impaired party at user device 120 (act 370). The "conversation" between the hearing-impaired party and the hearing party may continue in this manner, with CA 140 acting as a conduit between the hearing-impaired party at user device 120 and the hearing party at telephone device 150. That is, each time the hearing party responds with a voice message, CA 140 types a text message that is transmitted to user device 120 and each time the hearing-impaired party sends a text message, CA 140 voices a message to the hearing party corresponding to the text message.

A similar process may occur when a hearing party wishes to establish communications with a hearing-impaired party. For example, a hearing party may contact a CA, such as CA 140, and indicate that he/she wishes to call a hearing-impaired party, such as a party associated with user device 120. In this case, CA 140 establishes a socket or connection to user device 120, possibly via server 130. The hearing-impaired party, via user device 120, and CA 140 may then communicate via streaming text messages, as described above, with CA 140 acting as the conduit for the conversation between the hearing party at telephone device 150 and the hearing-impaired party at user device 120.

As discussed above, the communication link between CA 140 and user device 120 may be a persistent, full duplex link. In this case, the hearing-impaired party at user device 120 and operator at CA 140 may receive the information as it is being typed in real-time or near real-time. For example, as the hearing-impaired party at user device 120 or the operator at CA 140 types, the other party receives the information as it is being typed without waiting for the sending party to complete the message and press "send." This helps prevent the "conversation" between the hearing-impaired party at user device 120 and the operator at CA 140 from getting out of synchronization when communicating with each other, which may occur when using some types of text messaging, such as instant messaging. In addition, using a persistent, full duplex link helps speed up the conversation since responses or additional messages may be typed as one of the parties is still receiving part of a text message. This may also result in the increased use of services of a CA since the text-based conversation between the hearing-impaired party and the hearing party may take place in a very efficient manner. In addition, a hearing-impaired party may place multiple calls using a single socket connection. That is, the socket connection does not have to be re-initialized each time a particular conversation ends.

In the manner described above, a hearing-impaired user and a hearing user may communicate without the use of a telecommunication device for the deaf/teletype (TDD/TTY), thereby extending the reach of the hearing-impaired party. In implementations consistent with the present invention, user device 120 may also receive images from CA 140, not just text messages. Similarly, user device 120 may also transmit images to CA 140.

Further, implementations consistent with the present invention may be used in any TRS environment, including VCO, HCO and STS. For example, in situations in which the hearing-impaired party can speak (e.g., a VCO environment), the responsible service provider (e.g., the local telephone company, a long distance telephone provider, etc.) may establish a conference call between the three parties (i.e., the hearing-impaired party, the hearing party and CA 140) via a conventional conference bridge. The conference bridge may allow the hearing-impaired party to communicate voice messages directly to the hearing party, without CA 140 relaying the intended voice message. CA 140, however, may still send text messages to user device 120 based on the responses of the hearing party. Further, in some implementations consistent with the present invention, CA 140 and the hearing-impaired party at user device 120 may establish a voice over Internet Protocol (VoIP) connection and the hearing party may audio-conference in via the connection to CA 140.

In an HCO environment, the party at user device 120 may be able to hear, but not speak. In this case, CA 140 may only be needed to generate voice messages based on text messages from user device 120. In an STS environment, the party at user device 120 may have speaking problems. In this case, CA 140 may receive voice messages from the speech-impaired party and re-voice the messages to the hearing party. CA 140 and the speech-impaired party may use text messaging to ensure that CA 140 clearly understands the speech-impaired party.

As described above, a hearing-impaired user and a hearing user may communicate without the use of a TDD/TTY. In addition, in the example described above with respect to FIG. 3, the hearing-impaired party connects to a hearing-party at telephone device 150. As described above, telephone device 150 may be a conventional PSTN telephone, a SIP-based telephone device or another telephone device that communicates over a packet-switched network, such as the Internet. In the case of a SIP-based telephone, VoIP may be used to provide voice connections from CA 140 and user device 120 to telephone device 150. In each case, the connection between CA 140 and a hearing-impaired party at user device 120 may be a persistent, full duplex link implemented using, for example, Java, JavaScript or another programming language.

In other implementations consistent with the present invention, the text messaging program executed by wireless device 120 and CA 140 may not support such persistent, full duplex socket connections implemented in Java, JavaScript, etc., or may only support these applications in a limited manner. In other cases, regulatory agencies may prohibit the use of such programs for use in relay service related applications.

In these cases, a hypertext markup language (HTML)-based program or other type of program may be used to facilitate communications between a hearing-impaired party at wireless device 120 and CA 140. For example, implementations consistent with the present invention may use an HTML client in an effort to support a wide variety of wireless devices 120 and operating systems that are popular with the deaf community. The HTML client may be offered as an alternative for those who cannot or prefer to not use, for example, a Java/JavaScript-based client.

Further, in situations in which an HTML client is used, the HTML client being executed by user device 120 may require that user device 120 to support a selected subset of HTML, but would not require JavaScript or Java. The HTML subset may include only HTML tags commonly supported by Web-enabled wireless devices. Further, because of the bandwidth and screen size limitations of wireless devices, the HTML client may limit or avoid the use of images. For example, any images transmitted may be small in both visual dimensions and file size and may be presented in 4-color grayscale. The page layout may also be designed to work on a small screen (such as 10 lines of 30 characters each).

Further, encryption may be used in the implementations described above, but may not be supported for some implementations using the HTML client. Not using encryption may enable the widest range of user devices 120 to be supported. When using an HTML client in which encryption is not supported, the user may be warned that conversations will not be encrypted. For example, server 130 or CA 140 may transmit a warning message, such as "This call is not encrypted," before each call is connected.

In addition, the HTML client implementation may support the ability to determine the country associated with the caller's IP address. Although this information may not be meaningful in the case of a wireless client device, this information may be applicable for user devices 120 using the HTML client from a land-based computer.

Because of the limitations of HTML, the HTML client may deliver a different user experience than the Java/Java applet-based client. For example, unlike the Java-based client, an HTML client application may not be able to continually poll CA 140 to look for conversation updates from the operator. As a result, the hearing-impaired party at user device 120 may click a Send/Receive link for various acts. For example, the hearing impaired party may click a Send/Receive link to initiate a conversation, to send a reply, to get operator responses, etc. The user may also repeatedly click the Send/Receive link when waiting for an operator response since there may be no way for CA 140 to "push" the response to the HTML-only client.

In addition, each time the user selects Send/Receive, CA 140 may return the entire conversation to wireless device 120. This ensures that the user is able to see complete responses and does not miss or lose part of the conversation. A user may also select a "Response Display Threshold" at call setup time that would determine how many conversation responses to return with each click of the Send/Receive link. For example, if the user sets the threshold to "2," CA 140 would return the last two conversation responses from the hearing party. In this case, however, a user may miss responses if the number of outstanding operator responses since the last click of Send/Receive exceeds the Response Display Threshold.

In other implementations, a user may click a "back" link to scroll back through the conversation one response at a time. In addition, a "Conversation ended" HTML page may be provided to user device 120 when user device 120 clicks "Hang up" or the hearing party hangs up. Such a page may contain the entire conversation.

Further, the HTML-only client may retain the complete conversation (both sides) in memory while the call is active. This may be necessary so that the complete conversation can be returned to the caller each time the caller clicks 'Send/Receive'. The conversation text may be deleted from memory at the end of the call. Temporarily saving the entire conversation may be sensitive in terms of confidentiality, although the conversation may be saved only for the duration of the call.

The HTML client described above may be based on client-server architecture that uses a server interface. The server interface may use extensible markup language (XML) messages to communicate between the client and CA 140. The HTML client executed by user device 120 may make use of conventional "Start" and "End Session" XML messages, and may add a new "SendFullTextRequestMsg" XML message type that is a modified version of a conventional "SendTextRequestMsg" XML message. Using conventional XML messages or slightly modified XML messages simplifies the processing required to support the HTML client.

CONCLUSION

Systems and methods consistent with the present invention facilitate communications between hearing-impaired parties and hearing parties. An advantage of the invention is that hearing-impaired parties and other parties are able to initiate communications using any device that is capable of executing a text messaging software program. Another advantage of the present invention is that the typical speed with which text messaging traffic is exchanged enables the hearing-impaired party to effectively communicate with the desired third party in a near real-time manner with very little delays between communications.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described with the example of a CA operator manually typing text messages corresponding to voice messages from a hearing party. In alternative implementations, voice recognition software may be used to automatically generate text messages based on the received voice messages and automatically send the text messages via the text messaging program. Further, the text messages received by a CA may be automatically translated into voice messages using text-to-voice software. This may eliminate the need for a human operator at CA workstations. Thus, the present invention is not limited to any specific combination of hardware circuitry and/or software.

In addition, the present invention has been described with the example of a hearing-impaired party initiating a telephone call to a hearing party using any particular text messaging program. In other implementations, server 130 may provide the user with a choice of text messaging programs and allow a user to select the particular text messaging program. In some implementations, modifications to some conventional text messaging programs may be needed to facilitate communications between a hearing-impaired party, a CA and a hearing party. Lastly, a series of acts has been described with respect to FIG. 3. The order of the acts may be varied in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for providing communication services, comprising:
   receiving a request from a hearing-impaired party for establishing a communication link;
   identifying a communication assistant from a list of available communication assistants;
   forwarding the request to the communication assistant;
   establishing, by the communication assistant, a communication link to the hearing-impaired party using a text messaging program, wherein the communication link between the hearing-impaired party and the communication assistant comprises a persistent, full duplex link configured to allow each of the communication assistant and the hearing-impaired party to view text generated by the other respective party in a streaming manner;
   receiving a telephone number from the hearing impaired party, the telephone number being associated with a hearing party;
   establishing, by the communication assistant, a voice link with the hearing party;
   receiving, by the communication assistant, voice messages from the hearing party via the voice link;
   generating text messages, by the communication assistant, the text messages corresponding to the voice messages; and
   transmitting the text messages to the hearing-impaired party in a streaming manner.

2. The method of claim 1, wherein the request from the hearing-impaired party is transmitted via a wireless device.

3. The method of claim 1, further comprising:
   receiving, by the communication assistant, text messages from the hearing-impaired party in a streaming manner; and
   transmitting, by the communication assistant, voice messages to the hearing party, the voice messages corresponding to the received text messages.

4. The method of claim 1, wherein the request from the hearing-impaired party is a request for a socket connection received via a packet-switched network from a device executing a text messaging program.

5. The method of claim 1, wherein the request from the hearing-impaired party is received via the Internet.

6. The method of claim 1, wherein the voice link from the communication assistant to the hearing party comprises a voice over Internet Protocol link.

7. A system, comprising:
a server configured to:
receive a request from a wireless device associated with a hearing-impaired party for establishing a communication link to a hearing party,
identify a first communication assistant from a plurality of communication assistants, and
forward the request; and
a first device associated with the first communication assistant, the first device being configured to:
receive the request from the server,
establish a full duplex communication link to the wireless device, the full duplex communication link being configured to allow each of the first device and the wireless device to transmit text messages to the other respective device in a streaming manner,
communicate with the hearing-impaired party, via the wireless device, over the full duplex communication link using streaming text messages, and
establish a voice link with the hearing party.

8. The system of claim 7, wherein the first device comprises a workstation, the first device being further configured to:
receive voice messages from the hearing party via the voice link,
transmit text messages to the wireless device in a streaming manner, the text messages being input by the first communication assistant and corresponding to the received voice messages,
receive text messages from the hearing-impaired party in a streaming manner via the wireless device, and
transmit voice messages to the hearing party, the transmitted voice messages corresponding to the received text messages.

9. The system of claim 7, wherein the request from the hearing-impaired party is a request for a socket connection received via a packet-switched network.

10. The system of claim 7, wherein the request from the hearing-impaired party is received via the Internet.

11. The system of claim 7, wherein the first device is further configured to establish the voice link from the first communication assistant to the hearing party using voice over Internet Protocol.

12. The system of claim 7, wherein the first device is further configured to:
establish a conference call between the hearing-impaired party, the first communication assistant and the hearing party, the conference call utilizing voice over Internet Protocol.

13. The system of claim 12, wherein the conference call is configured to link the hearing-impaired party, the first communication assistant and the hearing party in at least one of a hearing carry over environment, a voice carry over environment and a speech-to-speech environment.

14. A computer-readable medium having stored thereon a plurality of sequences of instructions, said sequences of instructions including sequences of instructions which, when executed by a processor, cause said processor to:
receive a request from a wireless device associated with a hearing-impaired party, the request being associated with establishing a communication link to a hearing party;
establish a persistent, full duplex communication link with the wireless device, the persistent, full duplex communication link being configured to allow the transmission of streaming text messages; and
establish a voice link to the hearing party.

15. The computer-readable medium of claim 14, including instructions for further causing the processor to:
receive voice messages from the hearing party via the voice link;
transmit, in response to received voice messages, streaming text messages to the wireless device, the streaming text messages corresponding to the voice messages;
receive streaming text messages from the wireless device; and
display the streaming text messages as they are being received.

16. The computer-readable medium of claim 14, including instructions for further causing the processor to:
receive voice messages from the hearing party via the voice link;
automatically generate text messages corresponding to the voice messages;
transmit the automatically generated text messages to the wireless device in a streaming manner;
receive streaming text messages from the wireless device;
automatically generate voice messages corresponding to the received streaming text messages; and
transmit the voice messages to the hearing party.

17. A system, comprising:
means for receiving a request from a wireless device, the wireless device being associated with a hearing-impaired party and the request being associated with establishing communications with a hearing party;
means for forwarding the request to a communication assistant; and
means for establishing a full duplex data link between the communication assistant and the wireless device, the full duplex data link being configured to allow the streaming transmission of data between the communication assistant and the wireless device.

18. The system of claim 17, further comprising:
means for receiving streaming text messages from the wireless device;
means for transmitting voice messages corresponding to the received text messages to the hearing party;
means for receiving voice messages from the hearing party; and
means for transmitting streaming text messages corresponding to the voice messages to the wireless device.

19. A method, comprising:
receiving a telephone number from a wireless device associated with a hearing-impaired party, the telephone number corresponding to the telephone number of a first party;
establishing a full duplex data link with the wireless device; and
communicating with the hearing-impaired party via the wireless device over the full duplex data link using streaming text messages.

20. The method of claim 19, wherein the communicating comprises:
automatically translating text messages received via the full duplex data link to voice messages, and
transmitting the voice messages to the first party.

21. The method of claim 19, further comprising:
receiving voice messages from the first party;
automatically translating the voice messages into text messages; and
transmitting the text messages to the hearing-impaired party as streaming text messages via the full duplex data link.

22. The method of claim 19, further comprising:
communicating with the hearing-impaired party by transmitting image data from a communication assistant to the wireless device.

* * * * *